D. K. Kraatz.

Turbine Water Wheel.

No. 3,875. Reissued Mar. 8, 1870.

N. PETERS, PHOTO-LITHOGRAPHER, WASHINGTON, D. C.

UNITED STATES PATENT OFFICE.

WILLIAM FOOS, JOHN W. BOOKWALTER, AND MARY A. LEFFEL, OF SPRINGFIELD, OHIO, AND LAMAR FOOS, OF NEW HAVEN, CONNECTICUT, ASSIGNEES, BY MESNE ASSIGNMENTS, OF DAVID K. KRAATZ.

IMPROVEMENT IN WATER-WHEELS.

Specification forming part of Letters Patent No. 20,921, dated July 13, 1858; reissue No. 3,875, dated March 8, 1870.

*To all whom it may concern:*

Be it known that DAVID K. KRAATZ, of Ephratah, in the county of Lancaster and State of Pennsylvania, did invent a new and useful Improvement in Water-Wheels; and we do hereby declare that the following is a full, clear, and exact description thereof, reference being had to the annexed drawings making part of this specification, in which—

Figure 1:
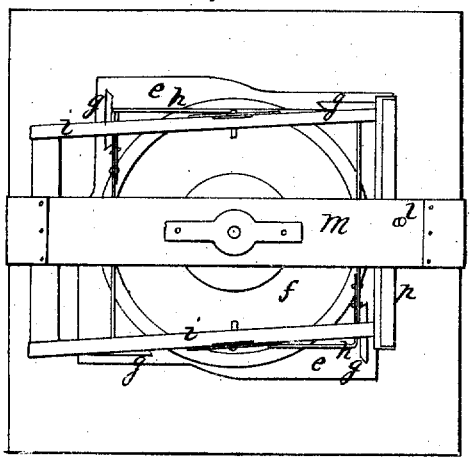
Figure 2:
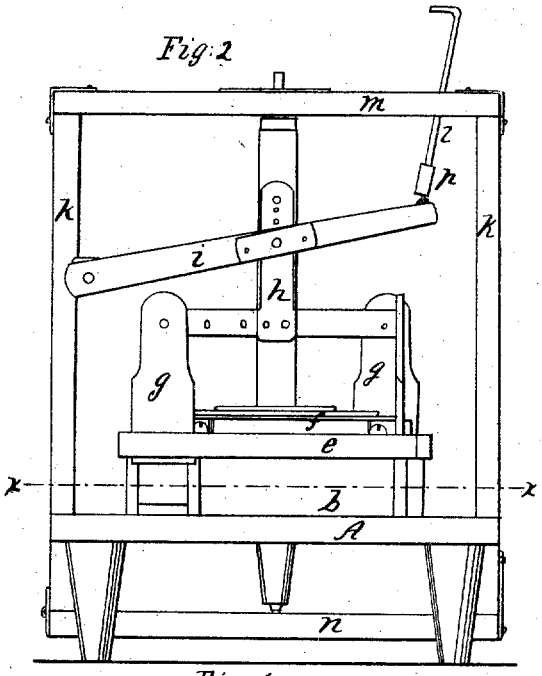
Figure 4:
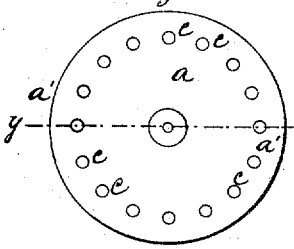
Figure 5:
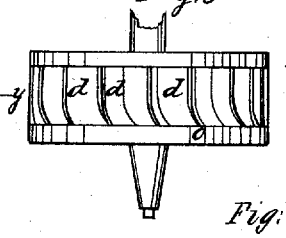
Figure 6:
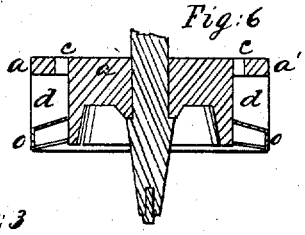
Figure 3:
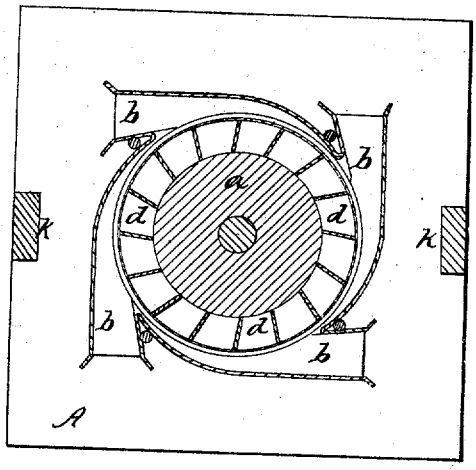

Figure 1 is a top view of the case. Fig. 2 is a side elevation thereof. Fig. 3 is a section on line *x x* of Fig. 1. Fig. 4 is a top view of the wheel. Fig. 5 is a side elevation thereof. Fig. 6 is a section of the same on line *y y* of Fig. 4.

The same letters refer to like parts in the several figures.

This invention relates to that class of water-wheels which receive the water horizontally and discharge it directly downward, and to the casing and guides which discharge the waters in several issues upon such wheel, and to the mechanism for operating the gates for simultaneously shutting off the water from such issues, or admitting it in equal and regulated quantities thereto.

In the annexed drawings, the wheel is shown in Figs. 4, 5, and 6. It consists of a central hub, *a*, formed with a hole through the center to receive the shaft, which is keyed thereto in the ordinary manner, and its outer surface is cylindrical. The buckets *d* are attached to this cylindrical surface, projecting radially therefrom. The upper parts of the buckets are formed in vertical planes, to receive the direct action of the water, which is discharged upon the wheel through the chutes *b* in a direction tangentially to the periphery of the wheel, as clearly shown in Fig. 3. The lower part of the buckets is curved in a direction opposite to that of the course of the entering water, to receive the gravitating force of the water. The band *o* surrounds the lower point of the buckets to hold them in place. From the upper edge of the hub *a* a flange, *a'*, projects over the top of the buckets *d*. This flange forms the top of the issues of the wheel, and, as the water passes through the issues of the wheel, it will press upward against this flange, and, with a pressure proportionate to the height of the head, tend to lift the wheel, and thus relieve the friction between the toe of the shaft and the pivot on the bridge-tree *n*, which supports the wheel and shaft. Holes *c* are bored through the flange *a'*, between the buckets *d*, for a purpose to be hereinafter explained. The wheel thus constructed is placed within the case placed upon the bottom of the fore-bay A. Four chutes, *b b*, are arranged around the wheel, as shown in Fig. 3. The bottom of these chutes is formed by the floor A. Their sides are formed as shown in Fig. 3, the outer sides being in the form of a scroll, to direct the water upon the wheel in a line tangentially to the periphery thereof. The top of the chutes is formed by a top plate, *e*. This is an annular plate, the outer edge of which is formed so as to cover the chutes *b*, and is formed with rectangular slots above the mouths of the chutes to receive the sliding gates *g*. On top of this annular plate *e* is placed a cap, *f*, which has a hole through the center, through which passes the driving-shaft. As this cap *f* is elevated above the hub *a*, an air-chamber will be formed between the two. The top plate formed by the parts *e* and *f* may be constructed in any manner that may be deemed expedient, provided it be so constructed as to form this air-chamber between itself and the wheel. The gates *g* are arranged to slide vertically across the mouths of the chutes, so as to shut off or regulate the quantity of water in the ordinary manner. These gates are connected by a frame formed by four horizontal bars, to which are attached, on opposite sides, two vertical standards, *h*, which are pivoted near the middle to two levers, *i*, pivoted to the side frames *k k* of the fore-bay. These levers are connected by a cross-bar, *p*, to which is fastened the rod *l*, so that by raising this rod the four gates *g* will be simultaneously and equally raised. The perforations *c* open from the top of the issues of the buckets into the air-chamber formed between the wheel and the covering-plates *e f*. The object of these openings is to permit the air which may be in the issues of the wheel to be driven by the force of the entering current of water out of the issues and into the air-chamber. As soon as the issue passes beyond the point where it receives the direct action of the water from the chute, the reaction of the air compressed in the air-chamber will cause a pulsation, pressing the air upon the water carried in the issue of the wheel, and forcing it out of said issue.

What is claimed as the invention of said KRAATZ, and desired to secure by Letters Patent, is—

1. In combination with the air-chamber over the wheel, and the issues formed between the buckets of the wheel, air-passages communicating between the air-chamber and said issues, substantially as and for the purposes described.

2. A water-wheel combining in its construction a central hub, *a*, buckets *d*, the faces of which are vertical at top to receive the direct action of the water, and inclined at the bottom to receive the gravitating force, and a flange, *a'*, extending outwardly from the central hub to form the top of the issues, and to receive the upward pressure of the water, substantially as set forth.

3. A water-wheel having a hub, buckets, and flange, substantially as described, in combination with a case covering the wheel, and chutes directing the water horizontally upon the wheel, substantially as described.

4. In combination with a water-wheel having a hub, flange, and buckets, substantially as described, a series of chutes or scrolls, *b*, and gates *g*, framed together so as to be simultaneously operated, whereby the wheel is adapted to operate with good effect with any proportionate quantity of water.

In testimony whereof we have signed our names to this specification before two subscribing witnesses.

W. FOOS.
JOHN W. BOOKWALTER.

Witnesses as to FOOS and BOOKWALTER:
JAMES S. GOODE,
WILLIAM A. SCOTT.

MARY A. LEFFEL.

Witnesses as to MARY ANN LEFFEL:
A. MYERS,
J. C. MORELAND.

LAMAR FOOS.

Witnesses for LAMAR FOOS:
DANL. B. BEACH,
JOHNSON T. PLATT.